United States Patent
Kakkar et al.

(10) Patent No.: US 9,959,148 B2
(45) Date of Patent: May 1, 2018

(54) METHOD AND DEVICE FOR ESTIMATING OPTIMAL RESOURCES FOR SERVER VIRTUALIZATION

(71) Applicants: Suresh Kakkar, New Delhi (IN); Vasudha Mishra, Noida (IN); Pankaj Mohan Dixit, New Delhi (IN)

(72) Inventors: Suresh Kakkar, New Delhi (IN); Vasudha Mishra, Noida (IN); Pankaj Mohan Dixit, New Delhi (IN)

(73) Assignee: WIPRO LIMITED (IN)

( * ) Notice: Subject to any disclaimer, the term of this patent is extended or adjusted under 35 U.S.C. 154(b) by 332 days.

(21) Appl. No.: 14/670,120

(22) Filed: Mar. 26, 2015

(65) Prior Publication Data

US 2016/0234130 A1 Aug. 11, 2016

(30) Foreign Application Priority Data

Feb. 11, 2015 (IN) .......................... 0674/CHE/2015

(51) Int. Cl.
*G06F 9/50* (2006.01)
*G06F 9/455* (2018.01)
*H04L 12/24* (2006.01)

(52) U.S. Cl.
CPC ........ *G06F 9/5077* (2013.01); *G06F 9/45558* (2013.01); *H04L 41/0893* (2013.01); *H04L 41/22* (2013.01); *G06F 2009/45562* (2013.01)

(58) Field of Classification Search
CPC .............. G06F 9/5077; G06F 9/45558; G06F 2009/45562; H04L 41/22; H04L 41/0893
See application file for complete search history.

(56) References Cited

U.S. PATENT DOCUMENTS

| 6,571,283 | B1 | 5/2003 | Smorodinsky | |
|---|---|---|---|---|
| 7,761,548 | B2 | 7/2010 | Snyder et al. | |
| 8,347,297 | B2 | 1/2013 | Mateo | |
| 8,612,987 | B2 * | 12/2013 | Naik | G06F 9/5072 718/104 |
| 8,924,561 | B2 * | 12/2014 | Brown | G06F 9/5072 709/226 |
| 9,294,557 | B2 * | 3/2016 | James | H04L 67/1004 |
| 9,450,838 | B2 * | 9/2016 | Jain | H04L 41/5025 |

(Continued)

FOREIGN PATENT DOCUMENTS

WO  WO 2013/110188 A1 * 8/2013 ........... G06F 9/5072

*Primary Examiner* — Patrice L Winder
(74) *Attorney, Agent, or Firm* — Finnegan, Henderson, Farabow, Garrett & Dunner LLP

(57) ABSTRACT

Embodiments of the present disclosure disclose a method and a device for estimating optimal resources for server virtualization. The method comprises receiving input data relating to requirements of server virtualization from a user device. The method further comprises filtering the input data by applying filtering rules. The method further comprises generating current landscape information of a plurality of servers using the filtered input data. The method further comprises determining values of virtualization parameters for a plurality of target servers using the current landscape information and predefined rules. The method further comprises determining landscape information of the plurality of target servers using the current landscape information and the values of virtualization parameters for estimating optimal resources for server virtualization.

20 Claims, 8 Drawing Sheets

(56) References Cited

U.S. PATENT DOCUMENTS

| | | | |
|---|---|---|---|
| 9,595,054 B2* | 3/2017 | Jain | G06F 9/5072 |
| 2009/0133018 A1 | 5/2009 | Kaneki | |
| 2011/0078303 A1* | 3/2011 | Li | H04L 67/1008 |
| | | | 709/224 |
| 2012/0053925 A1* | 3/2012 | Geffin | H05K 7/1498 |
| | | | 703/21 |
| 2012/0284410 A1* | 11/2012 | Dudek | G06F 9/5072 |
| | | | 709/226 |
| 2013/0160008 A1* | 6/2013 | Cawlfield | G06F 9/45558 |
| | | | 718/1 |
| 2013/0173773 A1 | 7/2013 | Anand | |
| 2014/0068071 A1 | 3/2014 | Fremont et al. | |
| 2014/0280977 A1* | 9/2014 | Martinez | H04L 41/5032 |
| | | | 709/226 |
| 2015/0281113 A1* | 10/2015 | Siciliano | G06F 9/5072 |
| | | | 709/226 |

* cited by examiner

METHOD AND DEVICE FOR ESTIMATING OPTIMAL RESOURCES FOR SERVER VIRTUALIZATION

This U.S. patent application claims priority under 35 U.S.C. § 119 to: India Application No. 674/CHE/2015, filed Feb. 11, 2015. The entire content of the aforementioned application is incorporated herein by reference.

TECHNICAL FIELD

The present subject matter is related, in general to Information Technology (IT) systems and infrastructure, and more particularly, but not exclusively to a method and a system for estimating optimal resources for server virtualization.

BACKGROUND

In recent years, server integration to consolidate hundreds of servers incorporation into less number of high performance servers has drawn attention. It is an object to consolidate systems operated on multiple servers into one server using virtualization technique and to reduce operation and maintenance cost. In this regard, the IT industry is going through transformational phase with physical servers getting virtualized, applications dynamically moving across servers, software defined data centers, etc. The server sizing for IT Infrastructure project is the key for successful IT infrastructure business. IT vendors as well as customers face a huge challenge in this area.

Today, the server sizing process is manual and people centric. There are no standard, accepted principles or practices for the same. Conventionally, to respond to a request for proposal of high investment from the customer, about 20-30 IT personnel typically work for 2-3 weeks in a closed room environment. The solutions and sizing requirement are discussed, and debated many times. There is no agreeable conclusion till the last day, which is acceptable to all.

Therefore, the current process for server sizing includes a manual and complicated process. The manual process is time consuming and requires a large amount of resources. At the end, the manual server sizing process may not give accurate results.

SUMMARY

Disclosed herein is a method and system for estimating optimal resources for server virtualization. The method comprises providing recommendations for IT landscape environment of a user by analyzing and categorizing the current data center server landscape which are due for refresh, consolidation and new implementation.

In an aspect of the present disclosure, a method for estimating optimal resources for server virtualization is provided. The method comprises receiving input data relating to requirements of server virtualization from a user device, filtering the input data by applying filtering rules, generating current IT landscape information of a set of servers using the filtered input data, determining values of virtualization parameters for a set of target servers using the current IT landscape information and predefined rules, and determining IT landscape information of the set of target servers using the current IT landscape information and the values of virtualization parameters for estimating optimal resources for server virtualization.

In an embodiment of the present disclosure, an estimation computing device for estimating optimal resources for server virtualization is provided. The estimation computing device comprises a processor and a memory communicatively coupled to the processor. The memory stores processor-executable instructions, which, on execution, causes the processor to receive input data relating to requirements of server virtualization from a user device, filter the input data by applying filtering rules, generating current IT landscape information of a set of servers using the filtered input data, determine values of virtualization parameters for a set of target servers using the current IT landscape information and predefined rules, and determine IT landscape information of the set of target servers using the current IT landscape information and the values of virtualization parameters for estimating optimal resources for server virtualization.

In another aspect of the present disclosure, a non-transitory computer readable medium is disclosed. The non-transitory computer readable medium includes instructions stored thereon that when processed by a processor causes an estimation computing device to perform operations comprising receiving input data relating to requirements of server virtualization from a user device, filtering the input data by applying filtering rules, generating current IT landscape information of a set of servers using the filtered input data, determining values of virtualization parameters for a set of target servers using the current IT landscape information and predefined rules, and determining IT landscape information of the set of target servers using the current IT landscape information and the values of virtualization parameters for estimating optimal resources for server virtualization.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIGS. 5, 6, 7 and 8 show exemplary snapshots for estimating optimal resources for server virtualization in accordance with some embodiments of the present disclosure.

DETAILED DESCRIPTION

Figure 1:
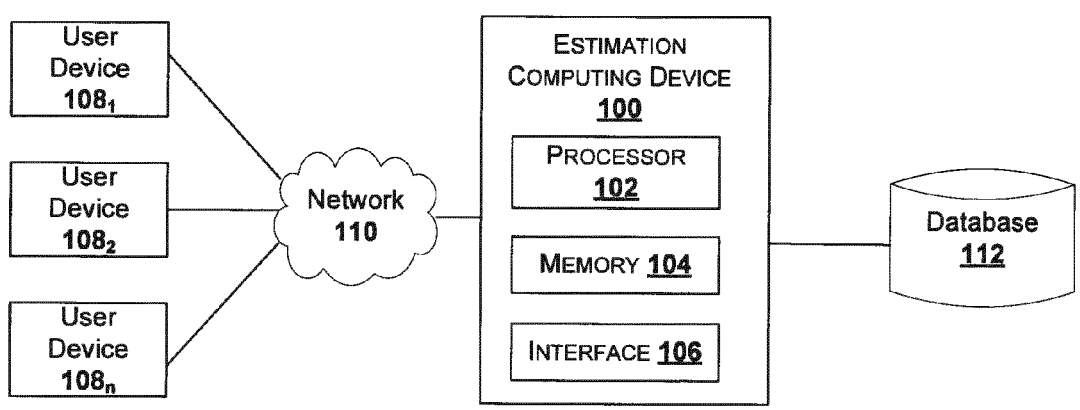
FIG. 1 illustrates a block diagram of an exemplary estimation computing device for estimating optimal resources for server virtualization in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a method and an estimation computing device for estimating optimal resources for server virtualization. The estimation computing device receives input data from the user comprising the current status of the servers to be virtualized. Then, the estimation computing device filters the input data to filter out data which is not considered as candidate for server virtualization. Then, the estimation computing device determines the current transformation and utilization details using the input data. Further, the estimation computing device determining using rules preconfigured in database. The estimation computing device then determines target transformation and utilization details using the current transformation and utilization details and the values for the virtualization parameters. Finally, the estimation computing device renders the target recommendations to the user for analysis. In an embodiment, the estimation computing device analyzes the recommendations using the self-learning techniques and updates the rules.

In the following description the term server virtualization refers to virtualization of servers.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary estimation computing device for estimating optimal resources for server virtualization in accordance with some embodiments of the present disclosure.

As shown in FIG. 1, an estimation computing device 100 for estimating optimal resources for server virtualization is disclosed. The architecture also comprises one or more user devices $108_1$, $108_2$, . . . $108_n$ (collectively referred to as user devices 108) and a database 112 connected to the estimation computing device 100. As shown in the FIG. 1, such user devices 108 are communicatively coupled to the estimation computing device 100 through a network 110 for receiving input data.

The user devices 108 comprise an application program that uses the services of the estimation computing device 100. The user devices 108 with the application program may be implemented in a variety of computing systems, such as a laptop computer, a desktop computer, a notebook, a workstation, a mainframe computer, a server, a network server, and the like. The user devices 108 may be used by various stakeholders or end users of the organization, such as project managers, executives and employees In an embodiment, the user devices 108 are used by associated users to provide input data regarding requirements of server virtualization. The user devices 208 are installed with interface 106 for communicating with the estimation computing device 100 over the network 110.

In one implementation, the estimation computing device 100, as shown in FIG. 1, includes a central processing unit ("CPU" or "processor") 102, a memory 104 and an interface 106. The processor 102 may comprise at least one data processor for executing program components and for executing user- or system-generated requests. A user may include a person, a person using a device such as those included in this invention, or such a device itself. The processor 102 is configured to fetch and execute computer-readable instructions stored in the memory 104. In one implementation, the memory 104 is communicatively coupled to the processor 102. The memory 104 stores processor-executable instructions to estimate optimal resources for server virtualization. The estimation computing device 100 may include the input/output (I/O) interface 106 for communicating with the one or more user devices 108.

In an implementation, the estimation computing device 100 also acts as user device. Therefore, the input data are directly received at the estimation computing device 100 to estimate optimal resources for server virtualization.

The database 112 stores information relating to the estimate optimal resources for server virtualization.

Figure 2:
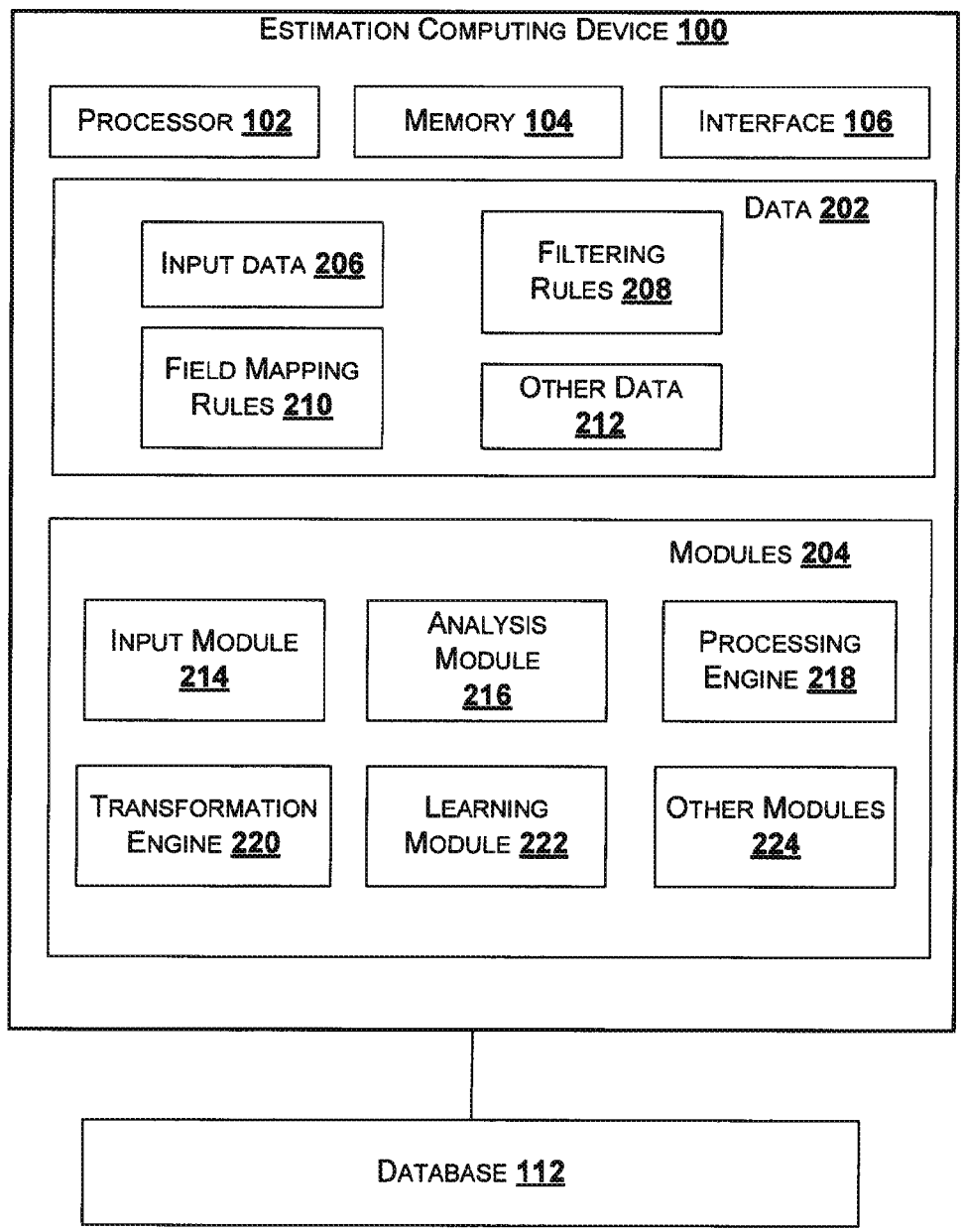
FIG. 2 illustrates a detailed block diagram of an exemplary estimation computing device in accordance with some embodiments of the present disclosure.

FIG. 2 shows detailed block diagram of estimation computing device 100 in accordance with some embodiments of the present invention.

In one implementation, the estimation computing device 100 may be implemented in a variety of computing systems, such as a laptop computer, a desktop computer, a notebook, a workstation, a mainframe computer, a server, a network server, and the like In an embodiment, one or more data 202 may be stored within the memory 104. The one or more data 202 may include, for example, input data 206, filtering rules 208, field mapping rules 210, other data 212.

In an embodiment, the input data 206 comprises input received from user regarding current setup of IT infrastructure of an entity. The input comprises asset information, type of workload, breakup of each data center location, application information, hardware specification and architectural consideration. In an exemplary embodiment, the input data may be stored in database 112. The user may update and/or modify the input data 206. As an example, the input data 206 may be provided by the user in a document format selected from at least one of .csv, .xls etc.

The filtering rules 208 comprise one or more rules to filter the input data 204. The filtering rules 208 filters out the input data 206 which are not required to estimate the resources for server virtualization. The result of applying filtering rules 208 is filtered input data which is then processed further for estimation of resources for server virtualization. Few non-limiting examples of filtering rules may be filtering out the servers which are legacy in nature, operating system which are not considered for consolidation, locations which are not in scope for the transformation plan. A person skilled in the art would understand that other filtering rules based on the requirement may be used with the present disclosure.

Figure 5:
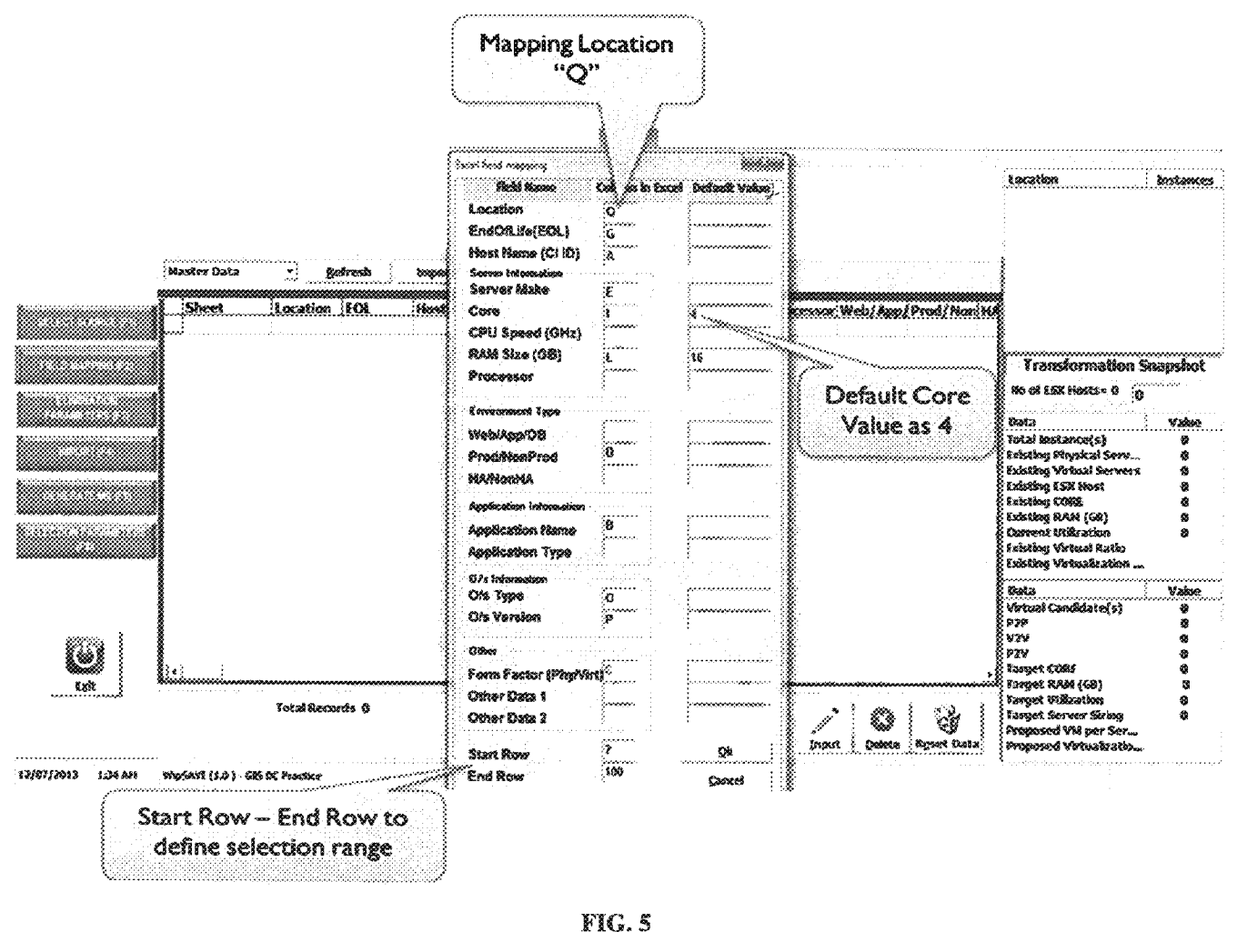

The field mapping rules 210 is used to perform field-column mapping of the input data 206. The field mapping rules 210 maps the fields in the input data with a respective column, for example a column of excel sheet as illustrated in FIG. 5.

In an embodiment, the data 202 in the memory 104 is processed by the modules 204 of the processor 102. The modules 204 may be stored within the memory 104.

In one implementation, the modules may include, for example, an input module 214, an analysis module 216, a processing engine 218, a transformation engine 220, a learning module 222. The estimation computing device 100 may also comprise other modules 224 to perform various miscellaneous functionalities of the computing device 100. It will be appreciated that such aforementioned modules may be represented as a single module or a combination of different modules.

In an embodiment, the input module 214 receives input data 206 from the one or more user devices 108 associated with the user. The input module 124 receives inputs from the user regarding the requirements of server virtualization. The input data 206 received by the input module 214 is stored in the database 112.

The analysis module 216 retrieves the input data 206 from the database 112. The analysis module 216 then categorizes the input data 206 into one or more predefined categories like data center locations, assets make and model, host ids, production vs non-production environment, critical vs medium critical applications, operating systems information and database version details etc. In an embodiment, the one or more categories are predefined based on the type of sizing user wants to perform. These categorized data input is then updated into the database 112.

Figure 3A:
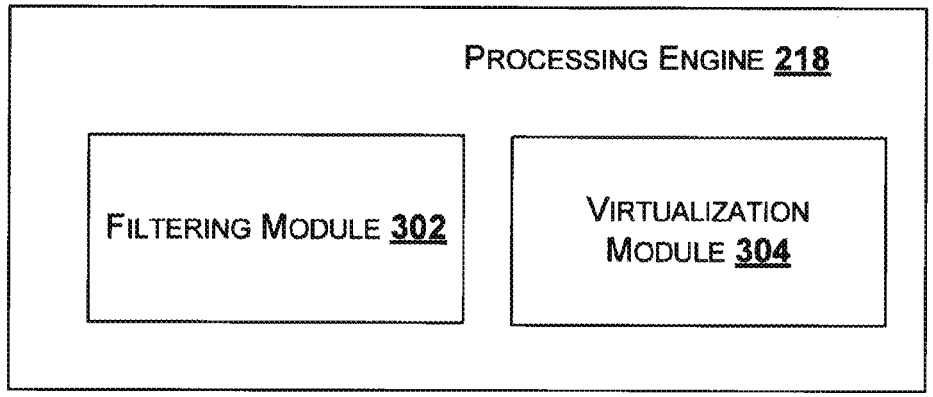
FIG. 3A illustrates an exemplary block diagram of a processing engine in accordance with some embodiments of the present disclosure.

The processing engine 128 processes the input data 206 to estimate optimal resources for server virtualization. The processing engine 218 comprises one or more sub modules as illustrated in FIG. 3A. The sub modules of the processing engine 218 comprise a filtering module 302 and a virtualization module 204.

The filtering module 302 filters out data which are not required to design IT landscape information of the set of target servers. The result from the filtering module 302 is the data which is used for further processing for estimating optimal resources for server virtualization. As an example, the filtering module 302 filters out data like applications which are legacy in nature, operating system which are not considered for consolidation, locations which are not in scope for the transformation plan etc. Further, the filtering module 302 performs data sensitization on the filtered input data. The data sensitization comprises aligning the filtered input data into a predefined format.

Further, the filtering module 302 performs field-column mapping of the input data using the field mapping rules 208 in the database 112. While performing field mapping, the user has the option to define default values for the columns for which data are not provided by the user. An exemplary screenshot of the field column mapping is illustrated in FIG. 5. For example, user does not provide data for server's core column. In such case, the user can define default value for this server column like 4. These values get stored into the utility as default value for this core column throughout project life cycle for sizing calculations. After the field mapping, the sensitized data is sent to the virtualization module 304.

The virtualization module 304 generates current IT landscape information of a set of servers using the filtered input data. In an embodiment, the virtualization module 304 determines number of servers which are virtualized, current server virtualization ratio, current utilization levels, existing physical vs. virtual servers, number of core and Random Access Memory (RAM) etc. Also, the virtualization module 304 determines values of virtualization parameters for a set of target servers using the current IT landscape information and predefined rules.

Figure 3B:
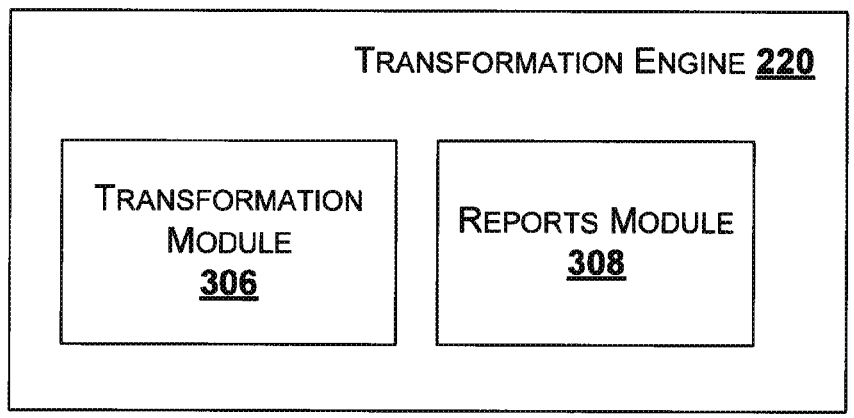
FIG. 3B illustrates an exemplary block diagram of a transformation engine in accordance with some embodiments of the present disclosure.

Referring back to FIG. 2, the transformation engine 220 transforms the current IT landscape of set of servers to IT landscape of set of target servers. The transformation engine comprises one or more sub modules as illustrated in FIG. 3B. The one or more sub modules comprise a transformation module 306 and reports module 308.

The transformation module 306 generates the complete transformation snapshot which drives the target transformation blue-print design for server virtualization. Further, the transformation engine 306 determines IT landscape information of set of target servers using the current IT landscape information and the values of virtualization parameters.

The reports module 308 provides 360 degree overview about the information of IT landscape information of set of target servers. In an embodiment, the reports module 308 generates one or more reports indicating the estimated optimal resources for server virtualization. The report can be generated in one or more predefined formats include, but are not limited to, .ppt, .xls, .doc, .pdf.

Referring back to FIG. 2, the learning module 222 is an intelligent repository which captures the similar set of incidents and activities for each of the individual projects which are performed by user. The learning module 222 also collects the feedback of user about the quality of inputs which are used in enhancing the future recommendations of the system.

Figure 4:
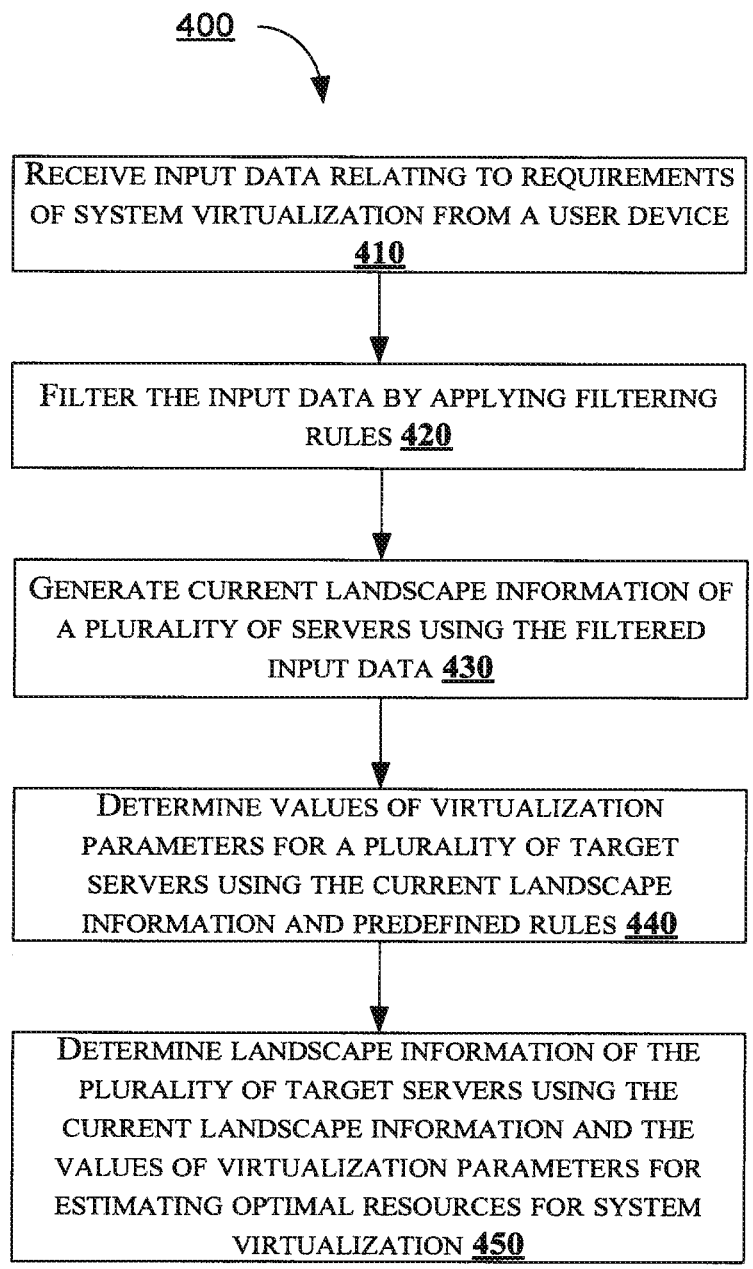
FIG. 4 shows a flowchart illustrating a method for estimating optimal resources for server virtualization in accordance with some embodiments of the present disclosure.

FIG. 4 shows a flowchart illustrating a method for estimating optimal resources for server virtualization in accordance with some embodiments of the present disclosure.

As illustrated in FIG. 4, the method 400 comprises one or more blocks for estimating optimal resources for server virtualization by the estimation computing device 100. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 410, receive, by the estimation computing device, input data relating to requirements of server virtualization from a user device. The input module 214 receives the input data provided by the user in the form of import file for e.g. .csv, .xls etc. In an embodiment, multiple files can be received from the user which contains Configuration Management Database (CMDB) information of the user in a very raw fashion. The input data is then consolidated in a predefined format to standardize and sensitize the inputted data. The input data is then forwarded to the filtering module 302.

Figure 6:
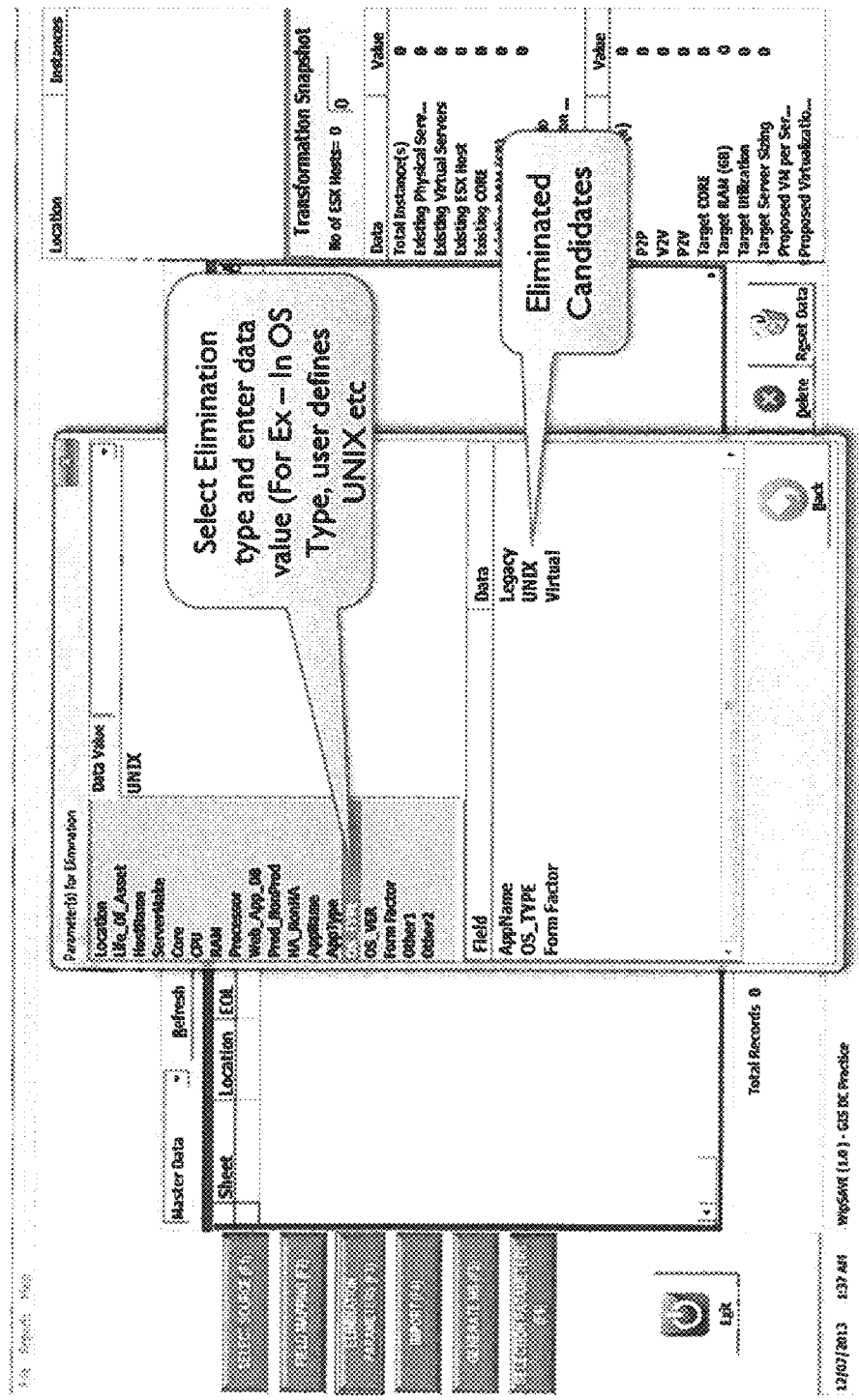

At block 420, filter, by the estimation computing device, the input data by applying filtering rules. An exemplary snapshot of filtering the input data is illustrated in FIG. 6. In an embodiment, the input data is filtered by applying the filtering rules 208 to eliminate unwanted data. The result of data filtration is filtered input data which is used for further processing. The one or more filtering rules 208 include, but are not limited to, type of Operating System (OS) like Unix, Mac, type of applications like legacy or vertical specific, type of server like virtual servers and location of servers like remote offices etc. A person skilled in the art would understand that any other filtering rules may be used with the method of present disclosure. As an exemplary scenario, UNIX environment is not considered for virtualization because of the application dependency and the high workloads. Also, servers which are already virtualized are not considered as candidate for server virtualization. Another criteria for elimination is criticality of the servers and the environment type, for example production/non production/test. The production servers are eliminated from virtual candidates list as the workloads will be higher and the application requires low latency.

At block 430, generate, by the estimation computing device, current IT landscape information of a set of servers using the filtered input data. To determine the current IT landscape information of the set of servers the filtered input data is sensitized to convert the input data into a predefined format. In an embodiment, the filtered input data is aligned in a predefined format. Further, field column mapping of the data is done using the field mapping rules 210. While performing field mapping the user has the option to define default values for the columns for which data are not provided by the user. For example user does not provide data for core column of a server. In such case, the user can define default value for this server column like 4, as illustrated in FIG. 5. The default values are stored into the database 112 as default value for this core column throughout project life cycle for sizing calculations. Then, the current IT landscape information of a set of servers is determined using the filtered and sensitized input data.

Figure 7:
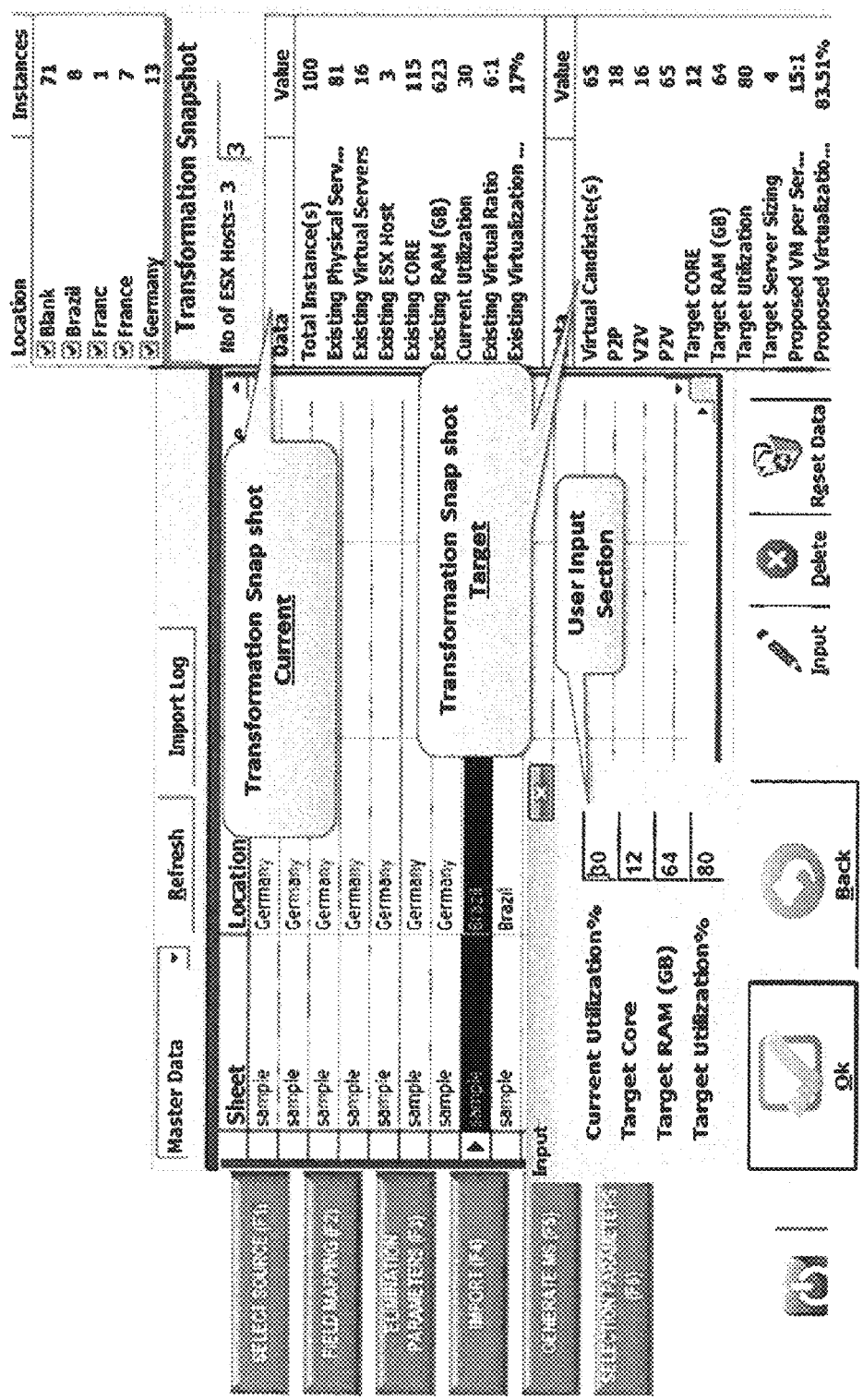

At block 440, determine, by the estimation computing device, values of virtualization parameters for a set of target servers using the current IT landscape information and predefined rules. In an embodiment, using the current IT landscape information and the predefined rules available in the database 112, the values for the virtualization parameters for set of target servers sizing are determined. The current IT landscape information and the predefined rules are categorized into appropriate categories including, but not limited to, core, Random Access Memory (RAM), location breakup, application workload segregation, systems make and model, current virtualization ratio etc. The categorization depends on the parameters defined by the user to draw the transformation snapshot for the target IT landscape of the organization. In an embodiment, if any information relating to the defined parameter is found missing or is incomplete, then the information is automatically populated based on the analyzed patterns generated by the rules in the database. FIG. 7 depicts an exemplary screenshot of categorization of input data received from the users to determine target virtualization candidates.

At block 450, determine, by the estimation computing device, IT landscape information of the set of target servers using the current IT landscape information and the values of virtualization parameters for estimating optimal resources for server virtualization. In an embodiment, the IT landscape information of the set of target servers is determined based on the one or more parameters. One of the one or more parameter may be total number of core, RAM and server utilization levels in the current IT landscape of the enterprise. Another parameter may be the target consolidation plan and server utilization levels required for target servers for each of the applications workload. For example, if an enterprise has 100 dedicated physical servers with 10 core each and with the maximum utilization level of 30%, i.e ((=100*10)*30%) that indicates 300 cores are used by the enterprise and 700 core are not utilized. Then, the workload is identified based on the application performance behavior patterns which can be accommodate onto these servers to increase the utilization levels and determine Return on Investment (ROI) for the user.

In another example, where workloads need to move to new hardware/server, multiple mix and match of servers product portfolio stored in the database is considered. In an embodiment, the user can choose the type of servers based on the Original Equipment Manufacturer (OEM) product, make and model, server configurations etc. to design the target server estate.

Figure 8:
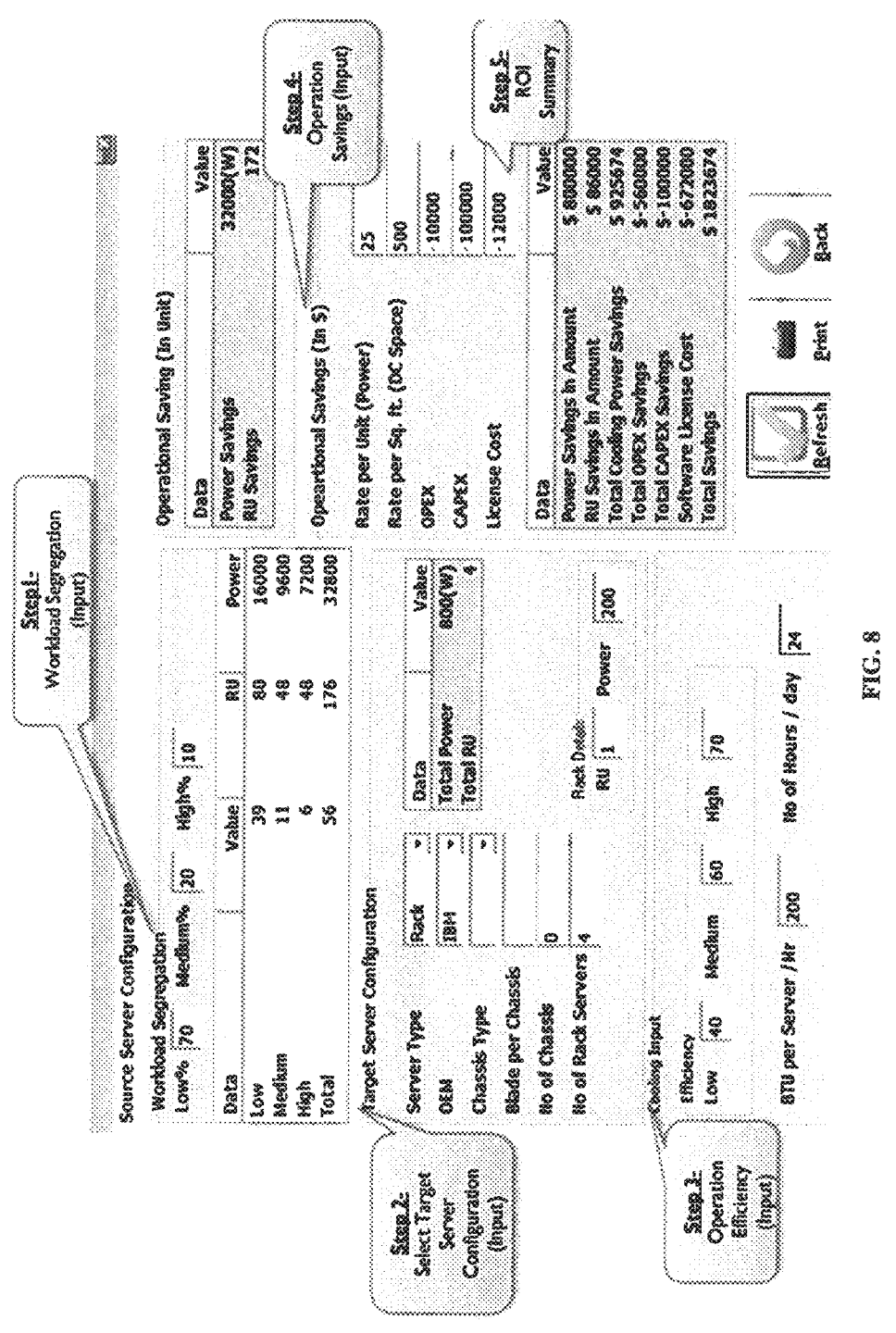

In an embodiment, the method further comprises performing ROI calculation which is used to determine saving of the user on the hardware. The ROI calculation primarily determines the user's Capital Expenditures (CAPEX) and Operating Expense (OPEX) investments, power and rack space requirements in the data center, software licenses cost which will be associated to the new implementation design for the user, savings of the user owing the new transformed estates etc. FIG. 8 depicts an example of the ROI report generated for the user.

In an embodiment, the method comprises capturing the estimated output, analysing the different outcomes and updating the rules in the database 112 automatically on the frequent basis. The set of parameters considered for self-learning and updating the rules are based on the sizing history and patterns based on the different scenarios. As an example, the different scenarios include most used sizing patterns, OEM/product specific patterns, patterns mostly used for the specific geographies, patterns mostly used for the specific vertical/industry, patterns mostly used for the specific type of workload, update new servers list (launched by OEM), update End-Of-Life/End Of Sale (EOL/EOSL) for particular server from OEM, update best practices for server sizing, server update notifications, user feedbacks, patterns used for winning themes etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

In an embodiment of the present disclosure, the server virtualization sizing for transformation business of IT Infrastructure projects is automated, optimally estimated and made more cost-effective for the IT organization.

In an embodiment, the present disclosure helps in process standardization and automation.

In an embodiment, the present disclosure provides better accuracy and justification to the user solution for server virtualization.

In an embodiment, the present disclosure saves time and efforts by automating the estimation process.

In an embodiment, the present disclosure provides information on quantified Savings (ROI).

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Estimation Computing Device |
| 102 | Processor |
| 104 | Memory |
| 106 | Interface |
| $108_1, 108_2, \ldots, 108_n$ | User Devices |
| 110 | Network |
| 112 | Database |
| 202 | Data |
| 204 | Modules |
| 206 | Input Data |
| 208 | Filtering Rules |
| 210 | Field Mapping Rules |
| 212 | Other Data |
| 214 | Input Module |
| 216 | Analysis Module |
| 218 | Processing Engine |
| 220 | Transformation Engine |
| 222 | Learning Module |
| 224 | Other modules |
| 302 | Filtering Module |
| 304 | Virtualization Module |
| 306 | Transformation Module |
| 308 | Reports Module |

What is claimed:

1. A method for estimating optimal resources for server virtualization, comprising:
   receiving, by an estimation computing device, input data relating to requirements of server virtualization from a user device, wherein the input data comprises asset information, type of workload, breakup of each data center location, application information, hardware specification and architectural consideration;
   filtering, by the estimation computing device, the input data by applying filtering rules, wherein the filtering rules filters out applications which are legacy in nature, operating system which are not considered for consolidation, and server locations which are outside the scope of server virtualization;
   generating, by the estimation computing device, current Information Technology (IT) landscape information of a set of servers using the filtered input data;
   determining, by the estimation computing device, values of virtualization parameters for a set of target servers using the current IT landscape information and predefined rules; and
   determining, by the estimation computing device, IT landscape information of the set of target servers using the current IT landscape information and the values of virtualization parameters for estimating optimal resources for server virtualization.

2. The method as claimed in claim 1 further comprising dynamically generating a report on the IT landscape information of the set of target servers.

3. The method as claimed in claim 1 further comprising updating the predefined rules based on patterns in estimating resources for the server virtualization.

4. The method as claimed in claim 1, wherein the filtering rules are based on at least one of:
   type of operating system, type of applications, and location of the plurality of servers.

5. The method as claimed in claim 1, wherein determining the current IT landscape information of the set of servers comprises formatting the filtered input data based on a predefined format of a virtualization system.

6. The method as claimed in claim 5 further comprising mapping default values to one or more columns in the formatted input data, for which data are not provided while receiving the formatted input data, wherein the default values are received from the user device.

7. The method as claimed in claim 1 further comprising determining a number of servers which are virtualized, a current server virtualization ratio, current utilization levels, existing physical vs. virtual servers, and number of cores.

8. The method as claimed in claim 1 further comprising categorizing the current IT landscape information and the predefined rules into one or more categories comprising core, Random Access Memory (RAM), location breakup, application workload segregation, systems make and model, and current virtualization ratio.

9. The method as claimed in claim 1 further comprising automatically populating missing or incomplete values of virtualization parameters based on analyzed patterns generated by the predefined rules.

10. An estimation computing device for estimating optimal resources for server virtualization, comprising:
    a processor; and
    a memory communicatively coupled to the processor, wherein the memory stores processor-executable instructions, which are executed by the processor to perform operations comprising: on execution, causes the processor to:
    receiving input data relating to requirements of server virtualization from a user device, wherein the input data comprises asset information, type of workload, breakup of each data center location, application information, hardware specification and architectural consideration;
    filtering the input data by applying filtering rules, wherein the filtering rules filters out applications which are legacy in nature, operating system which are not considered for consolidation, and server locations which are outside the scope of server virtualization:
    generating current Information Technology (IT) landscape information of set of servers using the filtered input data;
    determining values of virtualization parameters for a set of target servers using the current IT landscape information and predefined rules; and
    determining IT landscape information of the set of target servers using the current IT landscape information and the values of virtualization parameters for estimating optimal resources for server virtualization.

11. The estimation computing device as claimed in claim 10, wherein the processor is further configured to dynamically generate a report on the landscape information of the set of target servers.

12. The estimation computing device as claimed in claim 10, wherein the processor is further configured to update the predefined rules based on patterns in estimating resources for the server virtualization.

13. The estimation computing device as claimed in claim 10, wherein the filtering rules are based on at least one of:
    type of operating system, type of applications, type and location of the plurality of servers.

14. The estimation computing device as claimed in claim 10, wherein the processor is configured to determine the current IT landscape information of the set of servers by formatting the filtered input data based on a predefined format of a virtualization system.

15. The estimation computing device as claimed in claim 14, wherein the processor is further configured to map default values to one or more columns in the formatted input data, for which data are not provided while receiving the formatted input data, wherein the default values are received from the user device.

16. A non-transitory computer readable medium including instructions stored thereon that when processed by at least one processor cause an estimation computing device to perform operations comprising:

receiving input data relating to requirements of server virtualization from a user device, wherein the input data comprises asset information, type of workload, breakup of each data center location, application information, hardware specification and architectural consideration;

filtering the input data by applying filtering rules, wherein the filtering rules filters out applications which are legacy in nature, operating system which are not considered for consolidation, and server locations which are outside the scope of server virtualization;

generating current Information Technology (IT) landscape information of set of servers using the filtered input data;

determining values of virtualization parameters for a set of target servers using the current IT landscape information and predefined rules; and determining IT landscape information of the set of target servers using the current IT landscape information and the values of virtualization parameters for estimating optimal resources for server virtualization.

17. The medium as claimed in claim 16, wherein the instructions further cause the at least one processor to perform operations comprising dynamically generating a report on the IT landscape information of the set of target servers.

18. The medium as claimed in claim 16, wherein the instructions further cause the at least one processor to perform operations comprising updating the predefined rules based on patterns in estimating resources for the server virtualization.

19. The medium as claimed in claim 16, wherein the instructions further cause the at least one processor to perform operations comprising determining the current IT landscape information of the set of servers by formatting the filtered input data based on a predefined format of a virtualization system.

20. The medium as claimed in claim 16, wherein the instructions further cause the at least one processor to perform operations comprising mapping default values to one or more columns in the formatted input data, for which data are not provided while receiving the formatted input data, wherein the default values are received from the user device.

* * * * *